United States Patent [19]

Herr et al.

[11] Patent Number: 4,771,883

[45] Date of Patent: Sep. 20, 1988

[54] ARTICLE FOR STORING DIGITAL LASER DISC DEVICES

[75] Inventors: Arthur Herr, New York, N.Y.; Toby S. Welles, Norwalk; Robert W. Johnson, Westport, both of Conn.

[73] Assignee: Reynard CVC, Inc., New York, N.Y.

[21] Appl. No.: 143,897

[22] Filed: Jan. 13, 1988

[51] Int. Cl.$^4$ .............................................. B65D 85/57
[52] U.S. Cl. .................................... 206/313; 206/309; 220/347
[58] Field of Search ................. 206/307, 309, 311–313, 206/303, 444; 220/346, 347; 369/291

[56] References Cited

U.S. PATENT DOCUMENTS

| | | | |
|---|---|---|---|
| 2,500,773 | 3/1950 | Robins | 310/10 |
| 2,850,158 | 9/1958 | Woodward | 206/62 |
| 2,866,541 | 12/1958 | Ravis | 206/313 |
| 3,232,421 | 2/1966 | Young | 206/52 |
| 3,730,602 | 5/1973 | Campbell et al. | 312/10 |
| 3,860,248 | 1/1975 | Hunt et al. | 274/1 R |
| 3,876,134 | 4/1975 | Rice et al. | 206/312 |
| 3,888,350 | 6/1975 | Horvath | 220/347 |
| 3,951,264 | 4/1976 | Heidecker et al. | 206/309 |
| 4,174,034 | 11/1979 | Hoo | 220/347 |
| 4,266,784 | 5/1981 | Torrington | 369/77 |
| 4,316,539 | 2/1982 | Torrington | 206/307 |
| 4,387,802 | 6/1983 | Shearing et al. | 206/45 |
| 4,428,014 | 1/1984 | Saito | 360/133 |
| 4,463,849 | 8/1984 | Prusak et al. | 206/307 |
| 4,463,850 | 8/1984 | Gorog | 206/309 |
| 4,476,978 | 10/1984 | Saito | 206/312 |
| 4,535,888 | 8/1985 | Nusselder | 206/444 |
| 4,620,630 | 11/1986 | Moss | 206/45.24 |
| 4,635,792 | 1/1987 | Yamada et al. | 206/312 |
| 4,664,261 | 5/1987 | Frodelius | 206/387 |
| 4,694,954 | 9/1987 | Moss | 206/45.26 |
| 4,694,957 | 9/1987 | Ackeret | 206/309 |
| 4,702,369 | 10/1987 | Philosophe | 206/312 |
| 4,709,812 | 12/1987 | Kosterka | 206/310 |
| 4,722,439 | 2/1988 | Grobecker et al. | 206/312 |
| 4,726,615 | 2/1988 | Goldberg | 294/16 |
| 4,728,157 | 3/1988 | David, Jr. | 312/12 |

FOREIGN PATENT DOCUMENTS

| | | |
|---|---|---|
| 1201203 | 2/1986 | Canada . |
| 0035933 | 9/1981 | European Pat. Off. ............ 206/312 |
| 0157056 | 10/1985 | European Pat. Off. . |
| 0181835 | 5/1986 | European Pat. Off. . |
| 0212377 | 3/1987 | European Pat. Off. . |
| 3414903 | 10/1985 | Fed. Rep. of Germany . |
| 3610623 | 10/1987 | Fed. Rep. of Germany . |
| 0021009 | 12/1907 | United Kingdom ................ 206/313 |
| 2064486 | 6/1981 | United Kingdom . |
| 2147262 | 5/1985 | United Kingdom . |
| 2181038 | 4/1987 | United Kingdom . |
| 2184426 | 6/1987 | United Kingdom . |

OTHER PUBLICATIONS

Advertisement for CM 200 Series CD-ROM Drive from Laser Magnetic Storage International Company.
Advertisement for Toshiba CD-Rom Drive in CD--Rom Review, Jan./Feb., 1988.

*Primary Examiner*—Jimmy G. Foster
*Attorney, Agent, or Firm*—Pennie & Edmonds

[57] ABSTRACT

An insertable drawer member configured and dimensioned for receiving and storing digitally coded discs within an outer housing in a manner which ensures that information bearing areas of said discs are not damaged during insertion or removal therefrom, the insertable drawer member comprising: a base at least partially defined by a pair of opposed side walls, having upon its surface a semicircular groove configured for the insertion of a portion of the digitally coded disc by pressure contact, wherein only a non-information-bearing surface portion of the disc is ever contacted by the drawer member. The drawer member further comprises a lid integrally formed with the base and provided upon at least a portion of a front face thereof with a serrated gripping area to facilitate grasping and moving the drawer member to access the disc. A lower edge of the lid is configured for contact relation with an abutting V-shaped upper edge portion of the outer housing. The drawer member is additionally provided with means for retaining at least a portion thereof within the housing, which are operatively associated with corresponding means located upon an inner surface of the housing.

31 Claims, 9 Drawing Sheets

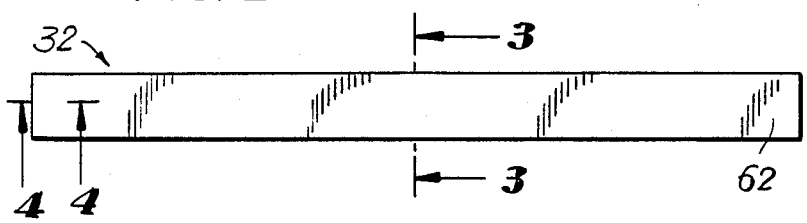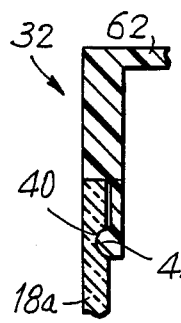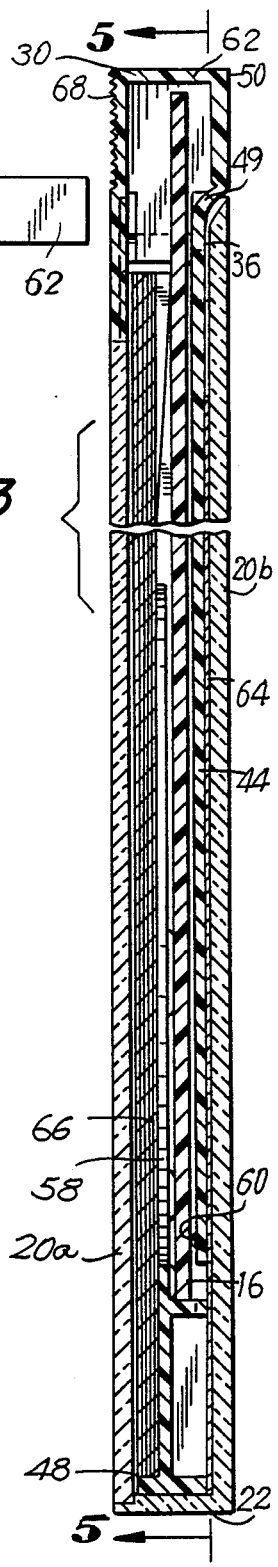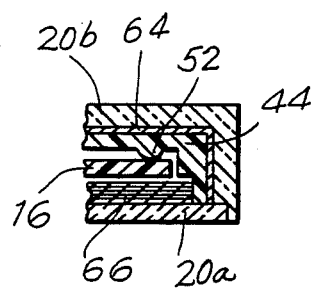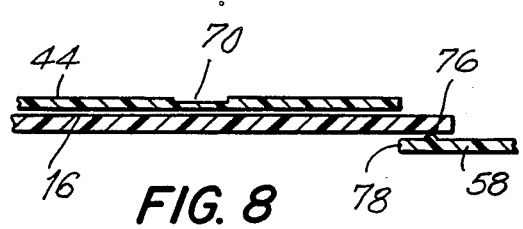

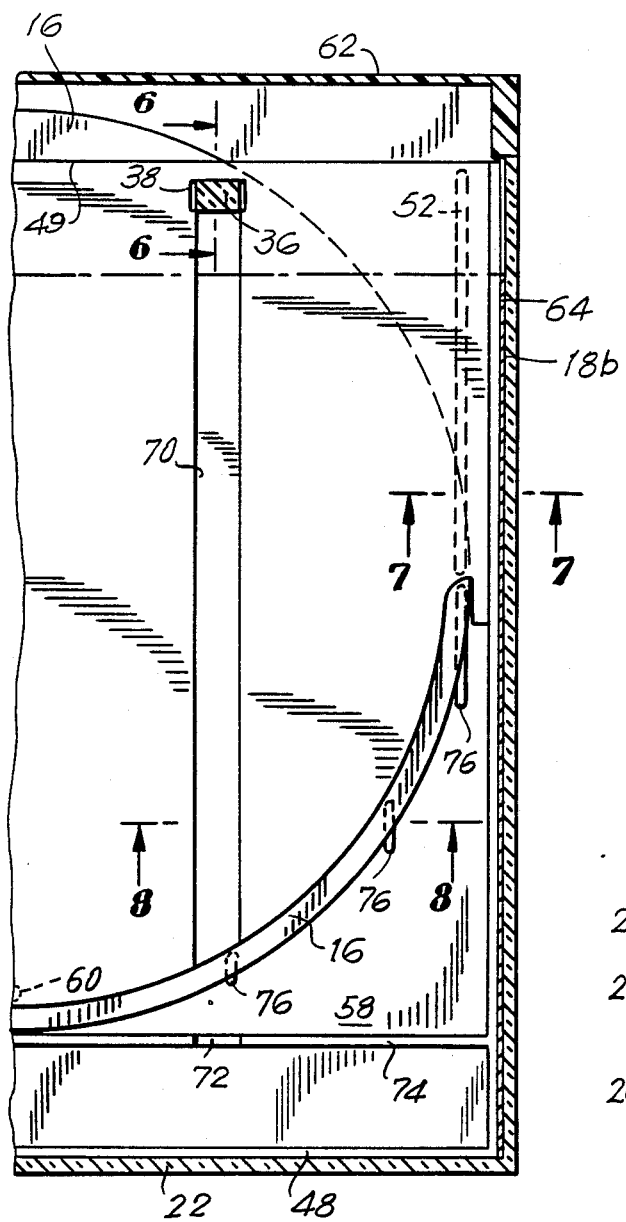
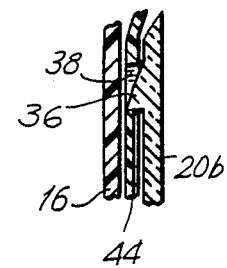

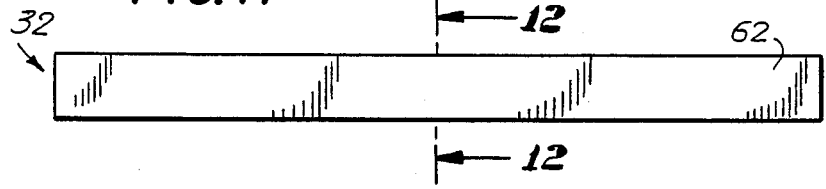
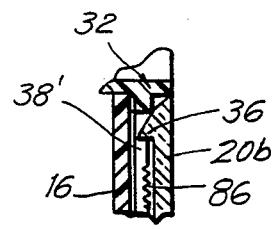
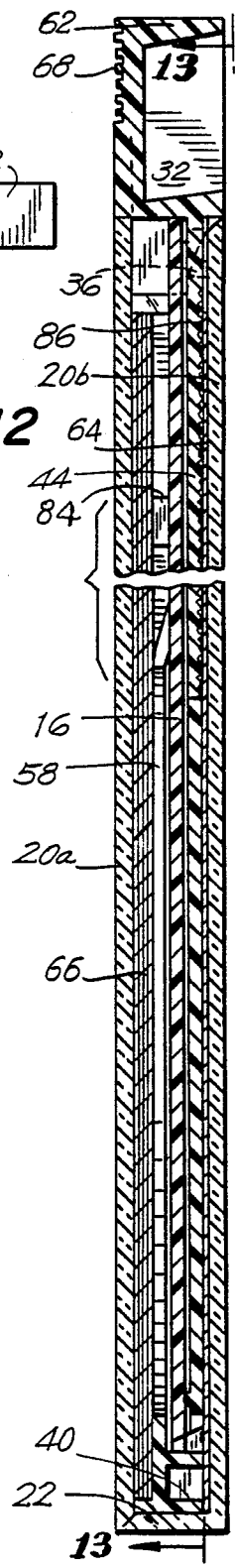
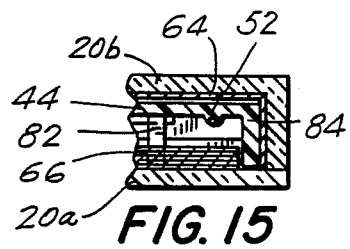
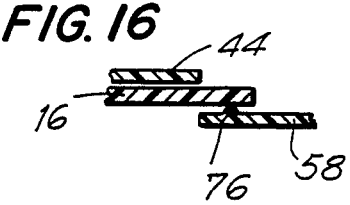
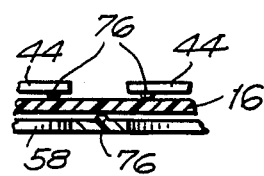
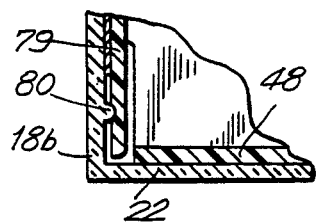

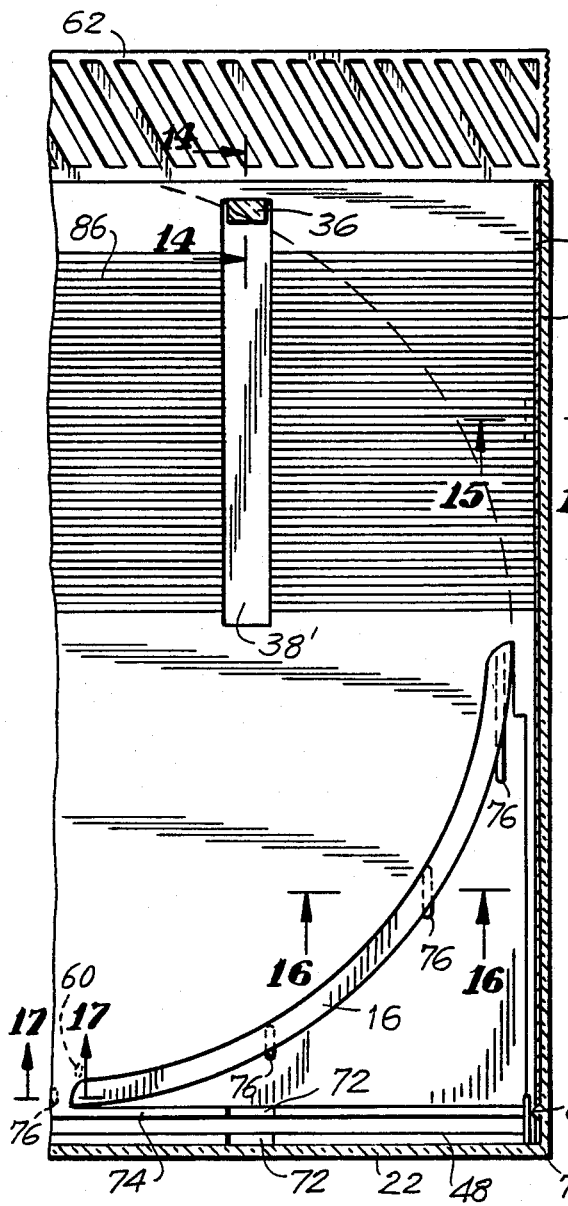
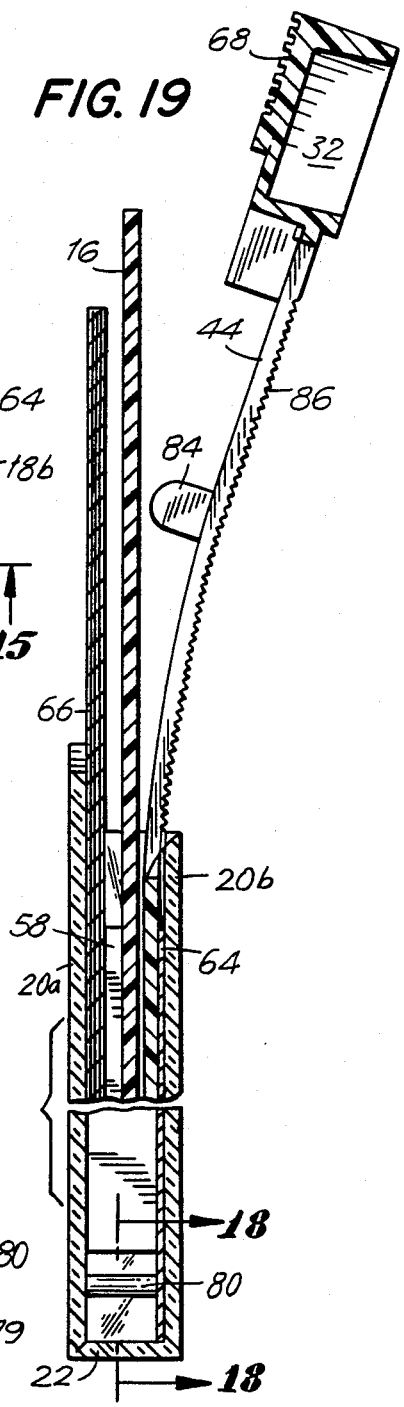

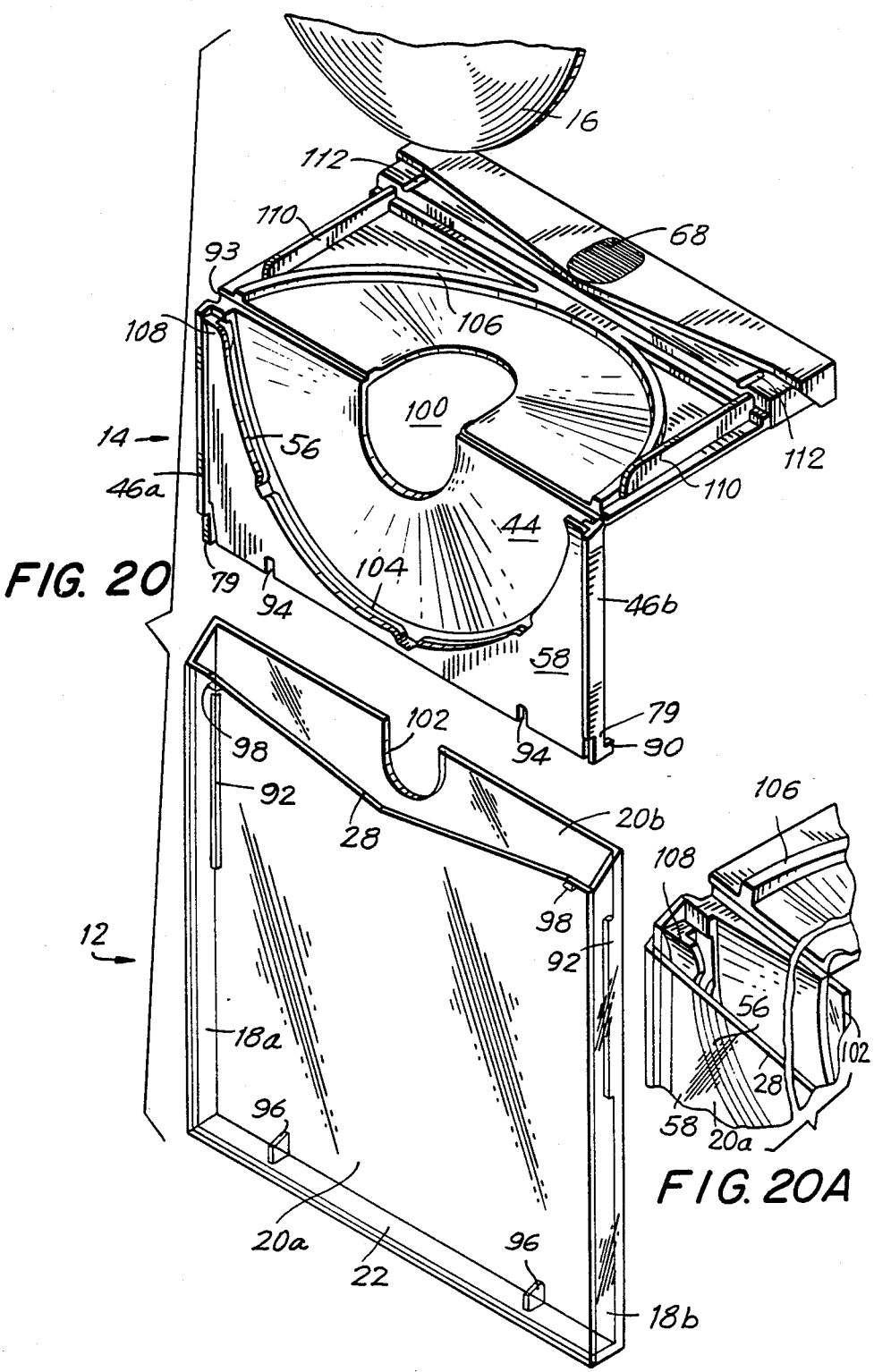

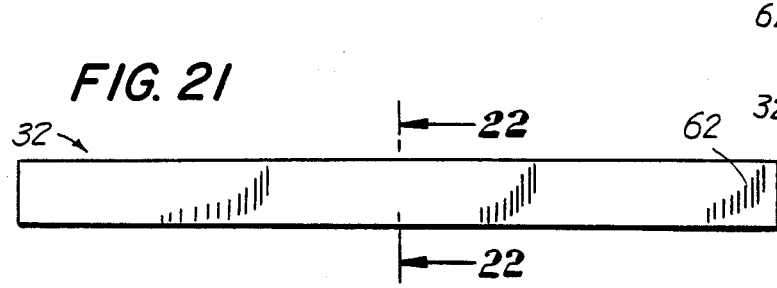
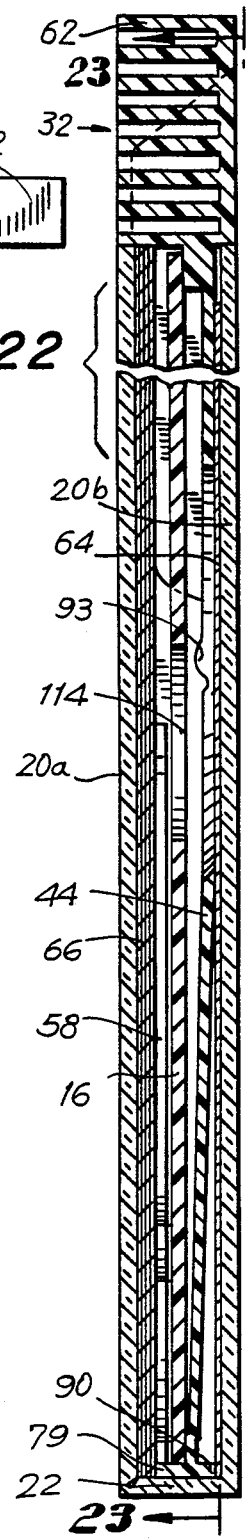
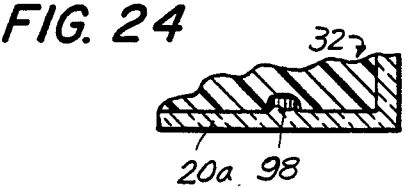
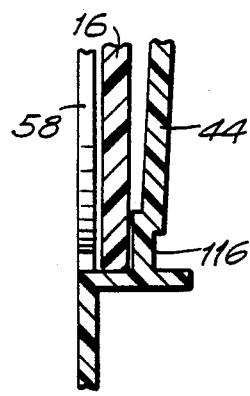
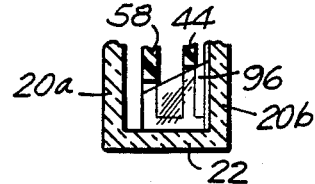
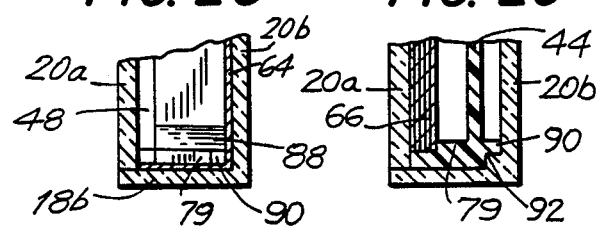
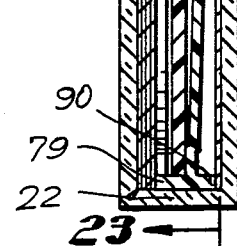

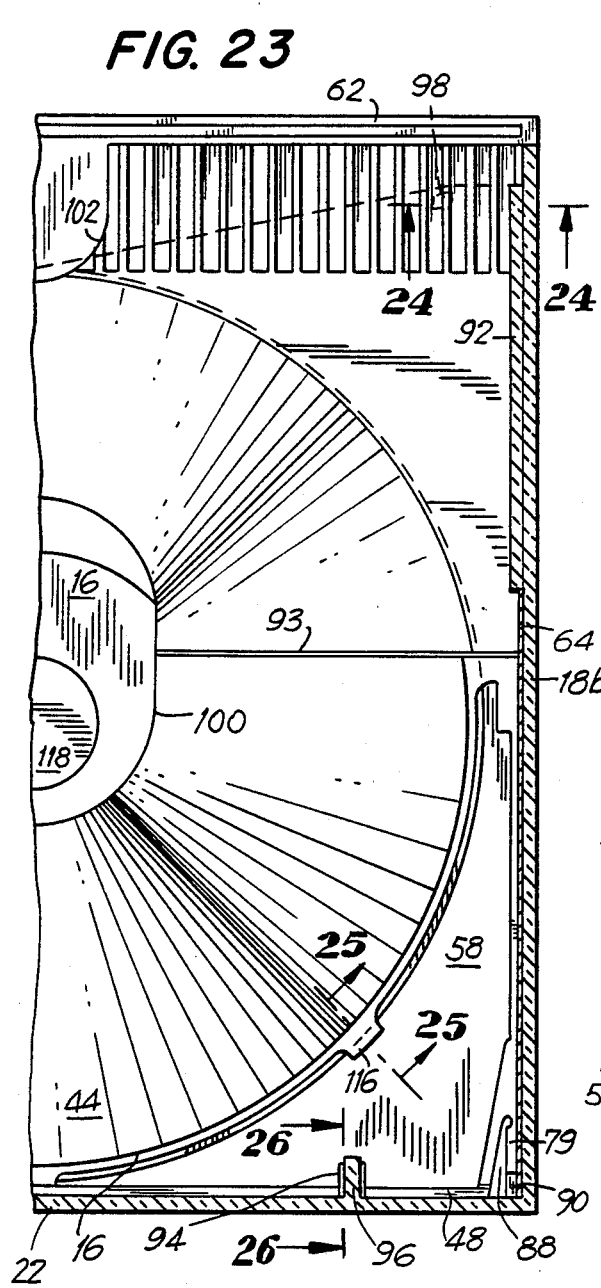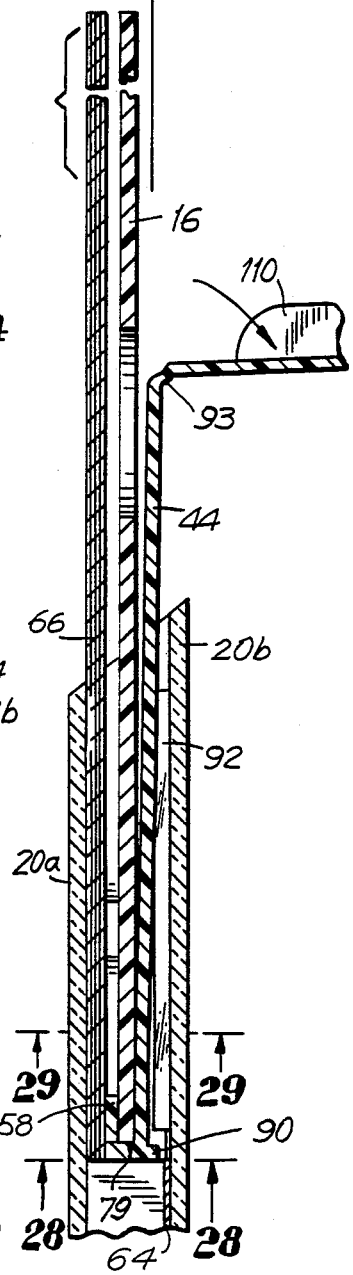

ARTICLE FOR STORING DIGITAL LASER DISC DEVICES

Technical Field

The invention relates to a packaging concept for storing digital laser disc devices such as CDs (compact discs), CD-ROMs (compact disc, read-only-memory) and video laserdiscs. More specifically, it concerns a molded thermoplastic insert for an outer box-like housing. The package is configured to accept and secure the disc during periods of non-use.

BACKGROUND OF THE INVENTION

Compact discs ("CDs") were originally designed as a storage/reproduction medium for the digital recording of music. Discs created for this purpose utilize a plastic-coated, aluminized surface having a standard diameter measuring 4.72 inches (12 cm.) and a standard thickness of 1.2 mm. Audio information is placed on only one surface of the disc (to simplify the manufacturing process) in digital form as a track of microscopic pits in the thin, reflective aluminum layer. It is the spacing and length of these pits, each being about 1 micron in length, which determines what data the disc player unit "sees".

In order to "play" such a disc, an infrared beam from a semiconductor laser is focused upon the pits through a series of lenses and prisms. Light striking a pit is scattered whereas light hitting the smooth surface between pits is reflected back to a prism through a photo-detector, i.e., a diode, that converts light into an electronic signal. The resultant on and off digital signal is then decoded and fed through an electronic filter, thus converting it from digital form into an analog signal suitable for any hi-fi amplifier.

More recently, audio compact disc technology of the type described above has been combined with a computer application in order to create an optical storage system known as the CD-ROM (compact disc, read only memory), utilizing either the standard 4.72 inch compact audio disc or the 5¼ inch size accepted by American manufacturers as a standard for digital information storage. Each CD-ROM can store over 500 megabytes of information, i.e., approximately 275,000 pages of text, which is 1,500 times that of a floppy disc and 10–50 times that of a hard disc.

Blank optical discs are constructed of a layer of a heat-sensitive metal film, an organic polymer (e.g., a plastic) or a combination of both, deposited upon an aluminum platter similar to that used for magnetic hard discs. Optical recording techniques deposit digital information upon the surface of the disc by marking this surface in a number of fashions. These techniques include: ablative recording, in which a laser creates a series of pits in the coating layer; bubble forming, in which the laser's heat generates a tiny volume of gas in the underlying polymer, which becomes trapped and thus forms a bubble in the surface of the metal film layer; and crystalline to amorphous phase change, in which the reactive layer of the disc is charged from light-reflecting to transparent by the writing laser.

The protective plastic coating on the surface of an audio CD or CD-ROM prevents dust or debris from reaching its reflective metal surface. In contrast, information stored on, for example, hard discs, must be carefully protected from dust, smoke, fingerprints, heat and other damaging conditions that don,t adversely affect a laser-read disc. Only significant scratches or blemishes can interfere with the laser light beam.

One common cause of such damaging scratches and/or blemishes is the removal and/or insertion of laser disc devices of the type described above from or into, respectively, a molded plastic storage case of the type commonly used to hold such discs. These cases contain many sharp edges which, if a disc is carelessly handled, can scratch or gouge the information-bearing surface of the disc and thus result in a loss of some or all of the information contained thereon.

A typical example of such a storage container is disclosed in U.S. Pat. No. 4,535,888 to Nusselder. This reference describes a plastic cassette suitable for the simultaneous storage of at least two discs having high information storage density such as, for example, an optically readable video disc or digital record. The cassette is provided with a box-shaped center portion having an intermediate bottom part respectively terminated at its upper and lower sides with a cover in the form of a box-shaped floor part. Each floor part is hingeably mounted at one side of the center part. The construction of this article enables a disc to be supported adjacent each floor portion and on either side of the intermediate bottom part by a raised seat and peg arrangement centrally disposed upon those parts. Storage cassettes constructed in this manner are commonly referred to as a "jewel-box" cassette due to their hinge-type construction.

SUMMARY OF THE INVENTION

Applicants have now developed a variety of storage cassettes for CDs, CD-ROMs, video laserdiscs and the like which overcome the disadvantages of the packaging utilized in the prior art. The present invention generally comprises a molded, insertable thermoplastic drawer member (i.e., "insert"), for placement within an outer box-like housing. The insert is configured and adapted for accepting and securing a disc of the type described above during periods of non-use.

Three embodiments of the invention have been described herein as illustrative of applicants' novel packaging concept. The invention should not, however, be construed as being limited solely to the embodiments illustrated in the attached drawing figures. That is to say, that the present invention relates as well to inserts not depicted in the drawings, which comprise a combination of features from two or more of the illustrated embodiments.

Each of the embodiments of applicants' storage cassette illustrated herein generally comprises a housing molded of a thermoplastic, such as polystyrene, containing an insert which is at least partially secured in some manner within the housing. The insert is molded of a polyolefinic thermoplastic, such as polypropylene and is provided with means for permitting the disc to be removably secured thereon without damage to the information-bearing surface thereof, such as that which may occur when a coded disc rides across a sharp plastic edge forming a portion of either the outer housing or the insert itself. Further, in addition to the disc, the package also normally contains a printed booklet and liner notes which carry promotional information such as song titles, artist biographies, etc.

The outer plastic housing of applicants' storage cassette remains substantively unchanged throughout each embodiment (i.e., A–C) disclosed herein. The housing is generally constructed having two pairs of oppositely disposed planar side members which are co-joined at a flat bottom member to form a generally rectangular box-like structure. In addition, the housing may optionally be provided with registration means which project into the interior thereof, such as the projecting members depicted with regard to embodiment C. These means assist in locating and seating a lower surface of the insert within the housing.

The housing in each instance has been provided with means for securing at least a portion of the insert therein when the package is opened in order to access the disc. In embodiments A and B, such securing means comprises a pair of integrally formed ramps spaced a distance apart on the rear (i.e., behind the insert) planar surface of the housing. These ramps project into the interior of the housing so as to engage, respectively, a corresponding pair of windows or channels extending entirely through the surface of the insert. In embodiment C, only a lower portion of the insert is secured within the housing. This is effected by a pair of flexible tab members located along both lateral edge portions of the insert. Each flexible tab is provided with a projecting finger which, when the insert is pulled about halfway out of the housing, engages a rib member formed integrally with the rear planar surface of the housing. This prevents the insert from traveling any further distance out of the housing and provides access to the upper half of the disc.

Further concerning the housing of applicants' storage cassette, the upper horizontal edge of the front planar surface, i.e., the closure member, in each of the illustrated embodiments is molded to have a broad, V-shaped profile. When the disc is inserted into or removed from the insert located within the interior of the housing, the V-shape edge on the upper surface of the closure member contacts only the edges, i.e., the non information bearing surfaces, of the disc, thus preventing the coded portions of the disc from being scratched or otherwise damaged. Such damage often leads to the loss of some or all of the information on the disc.

In addition to the similarities exhibited by the housing utilized with each embodiment of the invention, the various inserts include specific features to achieve the intended results. The purpose of the insert for use with each embodiment is, however, the same, i.e., to accept and secure a coded disc for storage during periods of non-use, while ensuring that the coded surfaces of the subject discs are not scratched or damaged during their passage into or out of the cassette storage package. Thus, each insert achieves the desired function in a slightly different manner.

The insert for use with embodiment A of applicants' storage cassette is tray-shaped and comprises a base portion defined by a pair of oppositely disposed vertical side walls and a horizontal bottom member which abuts the flat, bottom surface of the housing. Located upon an upper portion of the base and formed integrally therewith is the package lid, which is attached to the base portion by means of a living hinge. Extending perpendicularly downward from the lower surface of the lid are projecting tabs located along either side edge thereof. Each tab is formed with a projection which engages a corresponding notched portion on an upper surface of each of the lateral side walls of the housing.

The insert of embodiment A additionally comprises a pair of parallel vertical ribs positioned along the left and right edge portions, respectively, of the base. These ribs serve to guide the disc by its peripheral edges into a semicircular grooved portion of the insert. This grooved portion is comprised of an arcuate seat member, which forms the front wall of the groove, and the base of the insert, a portion of which is cut away so as to form a flexible flap, which defines the rear wall of the groove. The space between the seat member and the cut away base portion is sufficient to accept and secure a peripheral edge of the disc.

At least one spacer button is located upon a front face (i.e., that side which faces the disc) of the insert in the vicinity of the cut-away portion of the flexible flap formed by the base of the insert. In addition, several projecting members, molded integrally with a rear surface of the semicircular seat member, serve a function similar to that of the spacer button. That is to say that these projecting members serve to maintain a minimal degree of separation between the seat member and the flexible flap formed by the base of the insert. This prevents a rough edge along the periphery of either of the said surfaces from scratching or otherwise damaging the information-bearing surface of the disc when it is placed into or removed from applicants' storage cassette.

The insert utilized with embodiment B is molded with a slight curvature to achieve a removably secure fit within the housing. As this curved insert is received within the outer housing, a pair of parallel tab members, extending perpendicularly from the front face of the base portion on each side of the disc, is forced downwardly upon contact with an inner surface of the closure member. The force thus exerted upon these tabs serves to decrease the curvature in the insert. As the insert flattens out, a frictional fit is created between the insert and the outer housing which maintains the insert in position, even in the event the package is turned upside down.

As an adjunct to the frictional fit described above, a pair of flexible tabs are located along the bottom edges of the lateral side walls of insert B. Each such tab is configured with a horizontal notched portion which is adapted for an interlocking fit with a ridge member formed integrally with the corresponding lateral side walls of the package housing.

The insert of embodiment B is additionally provided with a pair of vertically parallel channel portions spaced inwardly from both outer side edges. These channel portions are configured to accept a corresponding pair of ramp members integrally formed on the inner surface of the rear face of the housing. This arrangement permits the insert to be pulled approximately half way out of the housing, i.e., up until the ramp members reach the terminus of the channel portions, by grasping the serrated front surface of the integrally formed handle portion. This action permits access to the upper half of the disc. The handle is provided with a serrated surface to facilitate a secure grip and thus to ensure a smooth, steady pull upon the insert as the package is opened.

As described above with respect to embodiment A, the front face of the insert is provided with a parallel pair of vertical rib members located between each channel portion and a corresponding parallel tab member, utilized for reducing the curvature of the unflexed insert. The purpose of the vertical ribs is to guide the edges of the coded disc into a grooved portion of the insert formed, at the front face, by an arcuately configured seat member and, at a rear face, by the base portion of the insert. As before, a semicircular portion of the insert base, located adjacent the upper edge of the seat member, is cut away to permit the disc to slide behind the seat member within the groove. A spacer button, located upon the front face of the insert base and projecting members which are integrally molded upon a rear surface of the seat member, serve to provide a minimum degree of separation between the members forming the groove and to prevent the sharp edges of these members from damaging the surface of the disc.

A rear surface of the insert is corrugated in the zone of the open channel portions. This permits the curved portion of the insert to be molded with an enhanced degree of flexibility without the need to make the insert thicker to compensate for any loss in strength due to the cut-out portions. Any such increase in thickness would have a negative effect upon the performance of the subject insert since the tolerances between the disc and the accompanying booklet and liner notes is limited.

The insert of embodiment C includes additional features to achieve the same results as embodiments A or B. When this insert is pulled forward, i.e., out of the mouth of its accompanying housing, an upper portion comprising approximately ½ of the insert, drops downwardly out of the way at an angle of about 30–45 degrees. This downward rotation is made possible by connecting the two portions of the insert with a flexible "living hinge". As the upper portion of the insert drops out of the way, the top half of the stored disc is exposed.

In order to ensure that the information-bearing surface of the disc is not caused to ride across any sharp, potentially damaging surfaces, the lower semicircular "disc capturing" portion of the insert is configured in the shape of a very shallow cone or funnel. The upper and lower halves of the insert are coplanar when the package is closed thus providing a secure support for the entire disc surface.

This structural arrangement may therefore be analogized to the act of inserting a coin into a funnel wherein, no matter how the coin is manipulated, only the edges of the coin or, in the present case, the coded disc, ever touch the surface of the insert. When the disc is seated on the lower half of the insert, the edges pass over a flat plateau located around the periphery of this "disc capturing" surface, which provides additional support for the uncoded portion of the disc during storage. The arrangement described herein prevents any damage to the disc which may cause loss of the information contained thereon.

Embodiment C of applicants' invention is also provided with registration means to ensure that the insert is reproducibly seated within the housing at a location which will not interfere with that of the enclosed promotional booklet described above. The insert is provided with a pair of notched areas in its base portion which correspond to members projecting from the inner surface of the housing base. As the base of the insert approaches the base of the housing, the projecting members are captured within the notched portions and the insert is therefore correctly positioned.

Further, to prevent the entire insert from being completely withdrawn from the housing, the insert is provided on its lower lateral edges with flexible tab members having rearwardly projecting finger members. These finger members are configured to catch upon raised ribs which, as described above, are integrally molded upon the inner surface of the rear planar wall of the housing. In effect, therefore, the flexible tabs permit the insert to pass downwardly (i.e., by compressing inwardly during assembly of the package) but not upwardly past a particular point.

Various alternate embodiments of applicants' insert are, of course, possible as discussed above. For example, insert B which is molded having a slight degree of curvature to ensure a frictional fit within the outer housing, may be molded with features similar to those of embodiment C, e.g., wherein a lower, semicircular "disc capturing" portion of the insert is configured to have a shallow cone or funnel shape. A flat shelf portion may be located along the periphery of the groove to provide additional support for an uncoded portion of the disc. Further, flexible tab members located at a terminal bottom portion of each lateral side wall of the insert can be provided with projecting members configured and adapted to catch upon raised ribs integrally molded upon an inner portion of the rear longitudinal wall of the housing. A base portion of the insert may be constructed with notched segments corresponding to upwardly projecting members extending from the base of the housing, such as those appearing in embodiment C. This arrangement is provided to properly seat the booklet within the housing. In a still further embodiment, the insert of embodiment A may be provided with the features of embodiment C, described above with regard to embodiment B.

BRIEF DESCRIPTION OF THE DRAWINGS

FIG. 2 is a top plan view of embodiment A as depicted in FIG. 1, assembled;

FIG. 3 is a sectional view taken along the line 3—3 of FIG. 2;

FIG. 4 is a partial sectional view taken along the line 4—4 of FIG. 2;

FIG. 5 is a partial sectional view taken along the line 5—5 of FIG. 3;

FIG. 6 is a partial sectional view taken along the line 6—6 of FIG. 5;

FIG. 7 is a partial sectional view taken along the line 7—7 of FIG. 5;

FIG. 8 is a partial sectional view taken along the line 8—8 of FIG. 5;

FIG. 9 is a sectional view, partially broken away, of the insert of embodiment A in an opened position;

FIG. 11 is a top plan view of the embodiment depicted in FIG. 10, assembled;

FIG. 12 is a sectional view taken along the line 12—12 of FIG. 11;

FIG. 13 is a partial sectional view taken along the line 13—13 of FIG. 12;

FIG. 14 is a partial sectional view taken along the line 14—14 of FIG. 13;

FIG. 15 is a partial sectional view taken along the line 15—15 of FIG. 13;

FIG. 16 is a partial sectional view taken along the line 16—16 of FIG. 13;

FIG. 17 is a partial sectional view taken along the line 17—17 of FIG. 13;

FIG. 18 is a partial sectional view taken along the line 18—18 of FIG. 19;

FIG. 19 is a sectional view, partially broken away of embodiment B in an opened position;

FIG. 20 is an exploded perspective view of a third embodiment, C, of the present invention;

FIG. 20A is a fragmentary view taken along the edge of the hinged insert of embodiment C;

FIG. 21 is a top plan view of the embodiment depicted in FIG. 20, assembled;

FIG. 22 is a sectional view taken along the line 22—22 of FIG. 21;

FIG. 23 is a partial sectional view taken along the line 23—23 of FIG. 22;

FIG. 24 is a partial sectional view taken along the line 24—24 of FIG. 23;

FIG. 25 is a partial sectional view taken along the line 25—25 of FIG. 23;

FIG. 26 is a partial sectional view taken along the line 26—26 of FIG. 23;

FIG. 27 is a sectional view, partially broken away, of the insert of embodiment C in the opened position.

FIG. 28 is a partial sectional view taken along the line 28—28 of FIG. 27; and

FIG. 29 is a partial sectional view taken along the line 28—28 of FIG. 27.

DETAILED DESCRIPTION OF THE PREFERRED EMBODIMENTS

Figure 1:
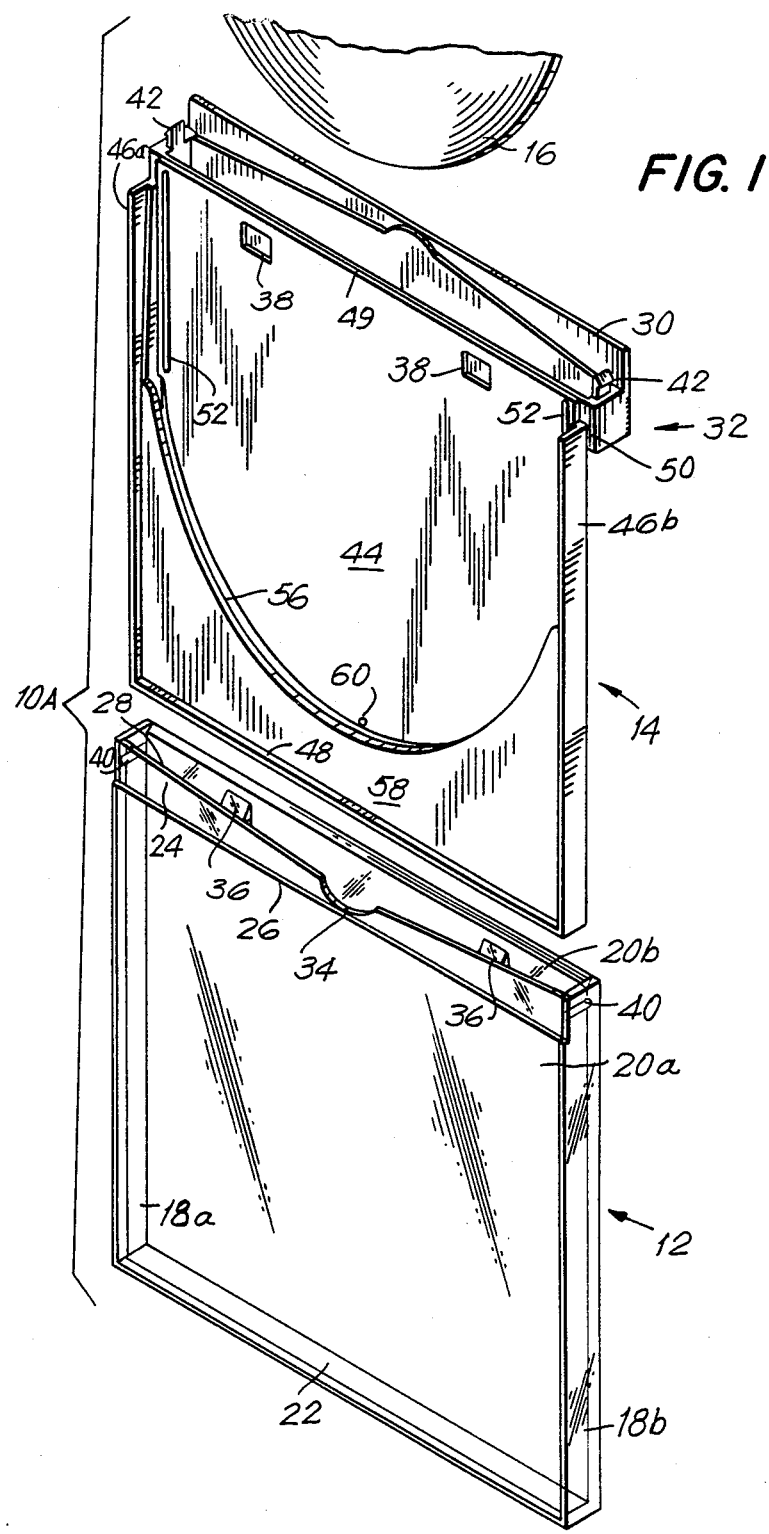
FIG. 1 is an exploded perspective view of a first embodiment, A, of the disc storage package of the present invention.

Referring initially to FIG. 1, there is illustrated a first embodiment (A) of applicants' novel disc storage package 10. Package 10 comprises an outer plastic housing 12 within which is slideably engaged an insertable drawer member 14 (hereinafter called the "insert") configured for holding disc 16. Housing 12 is preferably molded of a non-pigmented thermoplastic composition to permit the retail customer to visually observe the contents of package 10.

Housing 12, formed, as described above, of a molded thermoplastic, e.g., polystyrene, is constructed with two pairs of oppositely disposed side members 18a, 18b, 20a, 20b which are co-joined at bottom member 22. Front face 20a, hereafter referred to as the "closure", is separately molded from the remainder of housing 12 and is preferably secured thereto by a process such as solvent welding or ultrasonic bonding.

Closure 20a is provided with a recessed portion 24 on its upper surface 24, having a thickness relatively less than that of the remaining portion of closure 20a. Recessed portion 24 extends from ridge 26 to upper edge 28 of housing 12 and serves as a seat to receive front face 30 of lid 32. Lid 32 is formed integrally with insert 14 in a manner to permit flexing or bending along a hinge 49. Further, upper edge 28 of closure 20a is provided with a V-shaped profile which permits disc 16 to be inserted into housing 12 at an angle. Thus, the only portion of disc 16 which touches housing 12 is the margin or edge of the disc which does not contain any audio or visual data. Inserting disc 16 in this manner prevents the information-bearing surface thereof from riding or scraping across housing 12.

An eliptical cut-out along edge 28 makes it easier for the user's fingers to grip disc 16 when lid 32 of insert 14 is opened. Additionally, this cut-out permits access to peripheral printed material included with disc 16, such as a booklet containing explanatory information concerning the audio or optical data contained on the disc. The front face 30 of lid 32 is configured to match the contour of upper edge 28 in order to provide a smooth surface when closed.

Rear face 20b of housing 12 is provided on an upper surface with ramps 36 extending into the interior of housing 12, which are configured for slideable engagement with windows 38 in insert 14. An interlocking engagement between ramps 36 and corresponding windows 38 prevents insert 14 from sliding out of housing 12 during the removal of disc 16 or in the event that the package is turned upside down.

Additionally, side walls 18a, b of housing 12 are provided with notched portions 40 on the upper interior surface thereof for an interlocking engagement with tabs 42 molded integral with and extending perpendicularly from lid 32 of insert 14. In combination, therefore, the frictional fit between front face 30 of lid 32 and recessed portion 24 of closure 20a, together with the interlocking engagement of tabs 42 within notched portions 40, serves to maintain package 10 in a closed condition unless intentionally opened by the user.

Insert 14 is molded of a polyolefinic thermoplastic composition, such as, preferably, polypropylene. The insert is tray-shaped and preferably comprises base 44 defined by a pair of oppositely disposed parallel side walls 46a, b and bottom wall 48. An upper portion of base 44 comprises lid 32 which is attached to the base portion by flexible hinge means 49 such as, preferably, a "living hinge" arrangement. By "living hinge" applicants mean a thin, flexible, integrally molded portion of insert 14 connecting lid 32 and base 44. This "living hinge" permits lid 32 to be rotated through any desired angle up to about 120°, i.e., until a rear face 50 of lid 32 contacts longitudinal wall 20b of housing 12, so as to permit package 10 to be opened and disc 16 or any peripheral printed material located therein to be removed.

Insert 14 further comprises parallel ribs 52, extending perpendicularly to the surface of base portion 44. The purpose of ribs 52 is to guide the peripheral edges of disc 16 into a semicircular groove 56 defined at the rear by base 44 and at the front by molded seat member 58. A corresponding semicircular portion of base 44 adjacent seat member 58 is cut away so as to permit disc 16 to slip in between base 44 and seat member 58 within groove 56. Insert 14 is further provided with a molded spacer button 60 which serves to maintain a slight separation between disc 16 and the flexible cut-out portion of base 44. The purpose of spacer button 60 is to prevent the sharp edge along the periphery of the cut-out portion of base 44 from scratching the information-bearing surface of disc 16 when it is inserted or removed from groove 56.

If not for the presence of ribs 52, disc 16 might slide outside of groove 56, i.e., between seat member 58 and closure 20a, thus taking up space intended for a promotional booklet (not shown). Such booklets are commonly enclosed with discs 16 of the type envisaged and they may contain, for example, song titles or bibliographic information about the artist in the case of audio CDs.

Turning now to FIG. 2 there is illustrated upper plan surface 62 of lid 32. As noted above, lid 32 is formed integrally with base 44 of insert 14 and is flexibly attached thereto by living hinge 49.

FIG. 3 is a sectional view taken through the entire package 10. In addition to disc 16, package 10 includes various printed materials such as liner notes 64 and booklet 66 which may contain promotional text, such as song titles and/or photographs of the artists whose work is contained on disc 16.

Viewing FIG. 3 from left to right, there is illustrated closure 20a i.e., the front face of housing 12; followed by booklet 66 which is guided by side walls 46a, b of insert 14 to a position between closure 20a and disc 16; seat member 58 which, together with a semicircular cut-out on base 44, forms groove 56 for seating disc 16 therein. The friction generated between the flexible cut-out portion of base 44 and seat member 58 ensures a secure grip upon disc 16, even in the event that package 10 is shaken or turned upside down.

Continuing from left to right, there is illustrated disc 16, base 44 of insert 14, liner notes 64 and rear wall 20b of housing 12. As noted above, but which is illustrated more clearly in FIG. 3, spacer button 60 serves to position the flexible cut-out portion of base 44 away from the surface of disc 16 to prevent the sharp molded edge located thereon from scratching the surface of the disc.

Several features of the invention which are clearly observable in FIG. 3 include an interlocking fit between ramps 36 which are integrally molded on housing 12 and corresponding windows 38 in insert 14. Each ramp 36 is inclined downwardly to facilitate the slideable insertion of insert 14 into housing 12. These members, i.e., ramps 36, thereafter prohibit insert 14 from being pulled out of housing 12 when either disc 16 or booklet 66 is removed from package 10. Although rectangular ramps 36 and corresponding windows 38 are the preferred embodiment of the invention, other shapes may work as well or, as described below with relation to FIG. 10, windows 38 may be replaced by grooved channels permitting insert 14 to slide to a limited degree within housing 12 but which would prevent it from being pulled completely out.

Additionally, front face 30 of lid 32 is provided with a series of serrations or corrugations 68 molded into the plastic which provide a convenient no-slip gripping surface for the user. This roughened surface may be readily felt by those who use the product in a low-light environment or whose visual acuity may be deficient.

FIG. 4 is an exploded view of the interlocking fit between tabs 42 extending perpendicularly from lid 32 and a notched portion 40 on the interior of lateral side wall 18a of housing 12. This fit maintains lid 32 in a closed position until such time as the user employs sufficient force to overcome the engagement between housing 12 and lid 32 so as to permit the removal of disc 16 from package 10.

FIG. 5 is a partial rear view of insert 14 illustrating the features thereof. Base 44 contains, on its rear surface, a grooved portion 70 extending downwardly from window 38, which has a reduced thickness over that of the remainder of insert 14, but which does not extend entirely through insert 14. Grooved portion 70 facilitates the passage thereof over ramps 36. Corresponding to said grooved portion 70 is groove 72 in rear support member 74 which serves a similar purpose when insert 18 is placed within housing 12. Rib 52, one of a pair of ribs 52 located on the front face of insert 14 for guiding disc 16 into position in groove 56, is shown in phantom.

Further, a series of projecting members 76 are molded integrally with the rear surface of seat member 58, extending parallel thereto. Members 76 serve the same purpose as spacer button 60 in that they maintain a minimal degree of separation between the surface of disc 16 and seat member 58. Such a separation prevents the information-bearing surface of disc 14 from being scratched upon insertion into or removal from insert 14 due to the frictional engagement of disc 16 within groove 56.

FIG. 6 is a close-up view of the interengagement between a corresponding ramp 36 and window 38. Each ramp 36 is molded integrally with wall 20b of housing 12 and extends into the interior of housing 12. Each ramp 36 extends into a window 38 so as to prevent insert 14 from being drawn out of housing 12 together with disc 16 or booklet 66 when either or both is removed from package 10.

FIG. 7 is a sectional view taken through one of a pair of ribs 52, which are useful in guiding disc 16 into groove 56. From top to bottom, i.e., back to front, this view comprises rear planar wall 20b of housing 12, liner notes 64, base portion 44 of insert 14, having molded thereupon rib 52 for guiding disc 16 within said insert 14, disc 16, booklet 66 and finally closure member 20a. As noted above, ribs 52 serve by their presence to prevent disc 16 from sliding downwardly into a position between seat member 58 and booklet 66, thus missing the intended target, i.e., groove 56.

FIG. 8 is a sectional view taken through one of members 76 which illustrates the insertion of disc 16 between seat member 58 and a flexible portion of base 44. Members 76 thus serve to keep disc 16 from dragging across edge 78 of seat member 58 during insertion or removal of the disc so as to prevent damage to the information-bearing surface thereof.

FIG. 9 illustrates an alternate embodiment wherein ramps 36 are not engaged within windows 38. Rather in this embodiment, insert 14 may be withdrawn from housing 12 to a distance such that only its horizontal base member 48 is maintained within housing 12, i.e., by the engagement of base member 48 by ramps 36. This arrangement permits simplified access to booklet 66 and/or disc 16.

The previously described embodiment, i.e., wherein ramps 36 interlock with windows 38, is preferred, however, since, in the alternate form described above, insert 14 may be easily bent or broken, or one or both of ramps 36 may be snapped off due to an excessive amount of force being utilized in opening package 10. Interlocking ramps and windows avoid either type of damage.

Additionally, FIG. 9 illustrates the presence of a small space 78 located between front face 30 of lid 32 and the main body portion thereof. Wherein, as illustrated, body portion 31 is inserted into the open end of housing 12, face 30 is positioned exterior to closure 20a, covering recessed portion 24 and sealing thereover with a frictional fit.

Figure 10:
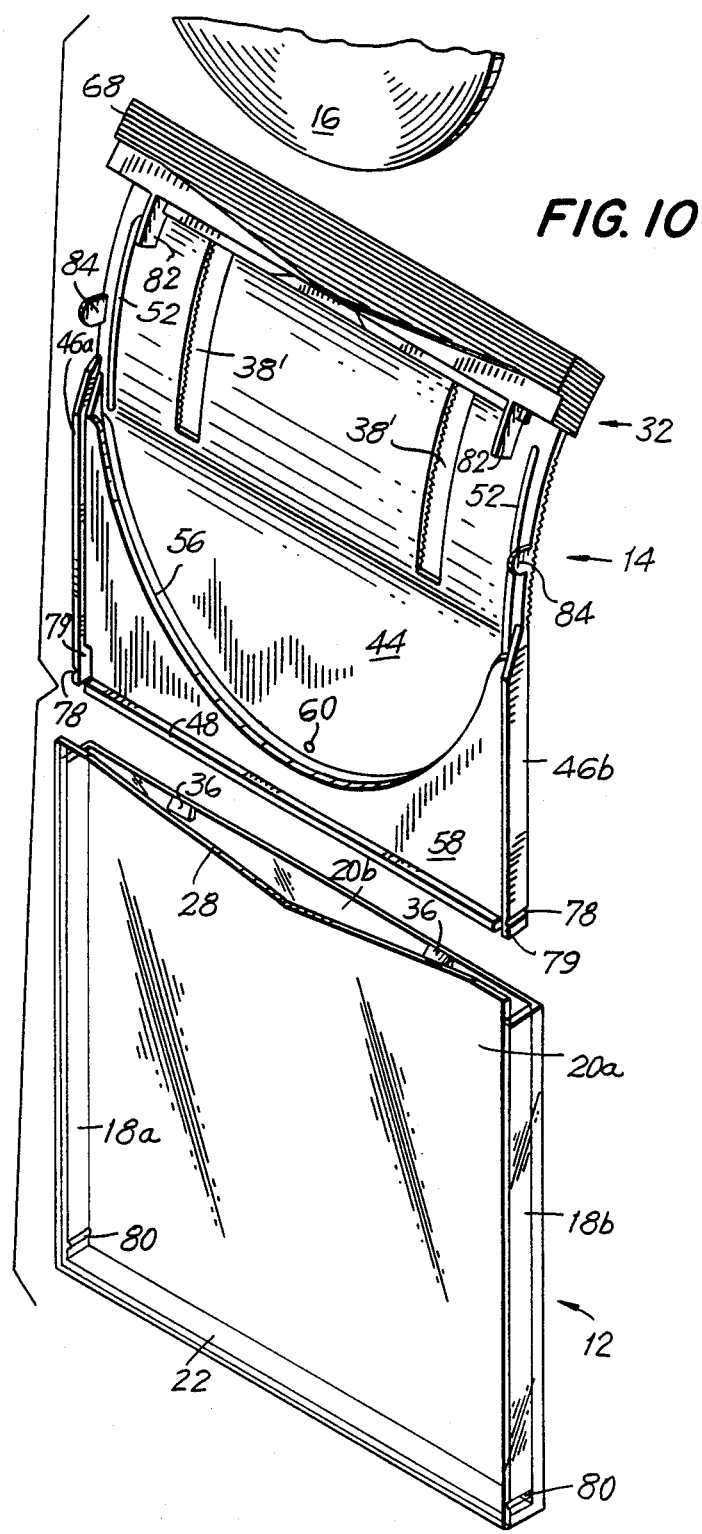
FIG. 10 is an exploded perspective view of a second embodiment, B, of the present invention.

Turning now to FIG. 10 there is illustrated a second embodiment (B) of applicants' disc storage package 10. Due to the similarities between embodiments A and B, features of both packages which are identical or which have the same function have been given the same numerical designation.

In the subject embodiment (B), insert 14 is molded with a slight degree of curvature, and is maintained within housing 12 due to a combination of: (1) a friction fit created between the insert and housing 12 when insert 14 is flattened to facilitate its passage into the housing, and (2) an interlocking engagement between notched portions 78 on lateral side walls 46a, b of insert 14 and raised ridges 80 located on corresponding lateral side walls 18a, b of housing 12. The lower portions of side walls 46a, b, i.e., below notches 78, are flexible to permit tabs 79 to squeeze inwardly past ridges 80 upon insertion of insert 14 into housing 12.

Ramps 36, integrally molded upon an inner surface of rear wall 20b forming a portion of housing 12, serve the same purpose as in embodiment A. In this embodiment, however, windows 38 have been replaced by grooves 38' which permit insert 14 to be at least partially withdrawn from housing 12, that is, up until the curved portion of insert 14 reaches upper edge 28 of housing 12. As described above, i.e., in relation to embodiment A of package 10, edge 28 has been molded to have a V-shaped profile with gently sloping sides in order to facilitate the passage of disc 16 across the top of closure 20a and down into groove 56 in insert 14. This V-shape is important in that it ensures that edge 28 of housing 12 contacts only the non-information bearing portion of disc 16 when the disc is inserted into or removed from package 10. Lid 32 is profiled in a corresponding manner and is molded to correspond to the configuration of edge 28 such that serrated portion 68 abuts against upper edge 28 of closure 20a when package 10 is completely shut.

Insert 14 is further provided with two pairs of parallel shelf members 82. Members 82 are integrally molded with lid 32 and serve to support booklet 66 (not shown) above disc 16. Further, tabs 84, extending perpendicularly from a front face of base 44 on insert 14, are provided along both side portions of the insert to force the bent portion of insert 14 to lie flat within housing 12 so as to create a frictional engagement between insert 14 and housing 12. Tabs 84 also serve a second function, that is to maintain booklet 66 in position. The preferred position for booklet 66 is in front of disc 16, between closure 20a and seat member 58. Further, as previously described with regard to applicants' embodiment A, raised ridges 54 are provided on base 44 of insert 14 to guide disc 16 into groove 56.

FIG. 11 illustrates the upper plan surface 62 of lid 32 in the same manner as FIG. 2. However, whereas lid 32 is formed integrally with the remainder of insert 14, it does not include the flexible hinge in the manner of embodiment A. Rather, as described above, the package 10 is closed by sliding the curved insertable drawer member 14 downwardly into housing 12 so as to straighten out the curve in insert 14 until the front face of lid 32 abuts against upper edge 28 of closure 20.

FIG. 12 is a sectional view taken lengthwise through embodiment B of applicants' package 10, which is similar to that previously illustrated in FIG. 3. Viewing FIG. 12 from left to right there is illustrated closure 20a, i.e., the front face of housing 12; followed by booklet 66 located between closure 20a and disc 16; and seat member 58 which, when taken together with a semicircular cut-out on base 44, forms groove 56 for seating disc 16 therein. As explained with reference to FIG. 3, the friction between the flexible cut-out portion of base 44 and seat member 58 creates a secure grip upon disc 16, even in the event that package 10 is shaken or turned upside down. Continuing, from left to right, there is shown disc 16, base portion 44 of insert 14, liner notes 64 and the rear planar surface 20b of housing 12.

The lines designated as 86 are indicative of a corrugated surface molded into the rear face of insert 14. Corrugations 86 serve to strengthen the molded plastic insert 14 without increasing the thickness thereof. Ramps 36 extend into grooves 38' in the corrugated portion of base 44 and slide therein as insert 14 is moved either upwardly or downwardly.

Turning now to FIG. 13 there is illustrated a partial rear view of insert 14 for use in embodiment B of package 10. As described above, disc 16 is frictionally engaged in groove 56 wherein projecting members 76, together with spacer button 60 serve to create a gap wide enough to insert disc 16 but narrow enough to prevent an edge portion of disc 16 from becoming scratched by the edges of the groove.

At the base of insert 14, a flexible side tab 79 on wall 46b is molded with a horizontal grooved portion 78. Groove 78 is configured for accepting ridge 80 which is integrally molded upon lateral wall 18b of housing 12. This locking engagement, in conjunction with the friction fit created by straightening the arcuate portion of insert 14 within housing 12 (by downward pressure exerted upon tabs 84) serves to maintain the container in a closed position, even when it is turned upside down. A corresponding arrangement is provided along the other parallel edge of insert 14.

In the subject embodiment (B), groove 38' extends completely through insert 14, from the front to the back face thereof. In addition, grooved portions 72 of support members 48 and 74, which are in alignment with grooves 38', facilitate the passage of the rear surface of insert 14 over ramps 36 upon its insertion into housing 12. Corrugations 86 have been molded into the rear face of the insert in order to strengthen it without rendering it thicker and therefor less flexible. As noted above, this form of construction permits insert 14 to be flattened out when downward pressure is exerted upon tabs 84 by sliding insert 14 into housing 12.

FIGS. 14–17 illustrate a number of sectional views taken through various portions of insert 14. For example, FIG. 14 is a view taken through groove 38' wherein ramp 36, integrally molded upon the inner surface of planar face 20b, extends into groove 38' to maintain insert 14 within housing 12.

FIG. 15 is a view taken through one of tabs 84. This view illustrates how a downward pressure exerted upon tabs 84 forces the curved portion of insert 14 to bend in a direction opposite the original angle of curvature and thus to assume a sufficiently straight configuration to enable it to slide into and out of housing 12 without binding.

FIG. 16 is a view taken through groove 56 illustrating the interposition of disc 16 between a flexible portion of base 44 and seat member 58 of insert 14 wherein seat member 58 is provided on a rear surface thereof with a series of molded members 76 extending perpendicularly from the surface thereof so as to create a minimal degree of space between base 44 and the seat member 58. The space thus created is at least sufficient for the insertion therein of at least an edge portion of disc 16.

FIG. 17 is a view through the center of groove 56, passing through seat member 58, disc 16 and the flexible portion of base 44 containing spacer button 60. Spacer button 60 is formed integrally with base 44, as shown in FIG. 1, while members 76 are molded upon a rear portion of seat member 58. Members 76 thus serve to maintain seat member 58 spaced apart from disc 16, i.e., the same function which is provided by spacer button 60.

FIG. 18 is a sectional view taken through FIG. 19. This view illustrates flexible tabs 79 located along the bottom portion of each lateral side wall 46a, b of insert 14. Flexible tabs 79 engage ridge 80 located on each side wall 18b of housing 12 at notched portion 78 (not shown), which is molded into the lateral side walls 18a, 18b of housing 14.

FIG. 19 depicts embodiment B of applicants' package 10 in an opened condition. From left to right, this view illustrates closure 20a, booklet 66, seat member 58, disc 16, base portion 44, liner notes 68 and rear longitudinal wall 20b of housing 12. The curvature of the unstressed insert 14 is clearly apparent in the subject drawing figure.

FIG. 20 illustrates a further embodiment (C) of applicants' disc storage package 10. In view of the similarities between the subject embodiment and versions A and B, features which are identical to those previously described or which have the same function have been identified with the same numerical designation.

Embodiment C is designed to slide open using only the most obvious and natural movements, in a manner similar to that of embodiment B. Lid 32 is provided with a thumb-shaped area 68 which is serrated in a similar fashion to the lid 32 of embodiment B, as shown and described with regard to FIG. 10.

When insert 14 is initially slid into housing 12 during the assembly of package 10, flexible tabs 79 bearing integrally formed perpendicular extensions 90 are compressed inwardly toward the main body of insert 14 upon contact with each of a pair of raised parallel ridges 92 integrally molded upon an inner surface of rear planar wall 20b of housing 12. This permits tabs 79 to proceed past ridges 92 so as to allow a lower portion of insert 14, containing notches 94, to engage projecting members 96 which serve to orient insert 14 within housing 12. Projecting members 96 are formed integrally with bottom face 22 of housing 12 and abut the rear planar surface 20b thereof.

As insert 14 is pulled forward, in order to open package 10, the engagement between projecting members 96 and notches 94 is overcome and insert 14 slides outwardly until perpendicular extensions 90 upon flexible tabs 79 catch upon ridges 92, which prevents any further forward motion.

As insert 14 slides forward, it carries with it booklet 66 (not shown) which accompanies insert 14 along its path until the upper edge of booklet 66 is arrested by projecting members 98 located upon the inner surface of closure 20a. This arrangement positions booklet 66 for grasping by the user if so desired.

In an alternate embodiment, members 98 may be extended to form raised ridges of up to about 1 inch in length and positioned horizontally on the inner surface of closure 20a. Thus, an overhead plan view of this arrangement presents the appearance of a shallow cone or funnel-shaped zone, similar to that created in the lower portion of the insert base, located between the inner surface of closure 20a and the front face of insert 14. This construction works in conjunction with V-shaped edge 28 of housing 12 to prevent disc 16 from being scratched or otherwise damaged when any portion thereof passes into an interior portion of housing 12.

When insert 14 reaches its point of maximum extension, i.e., when extensions 90 abut ridges 92, the outer half (i.e., that portion now outside of housing 12) of insert 14, which is attached to the inner half only by living hinge 93, drops downwardly to an angle of about 30 to 45 degrees. When this occurs, the outer half of disc 16 is exposed and may thus be grasped by the user.

Insert 14 is further provided with a centrally located aperture 100, a lower, ring-shaped portion of which corresponds to a cut-out portion 102 in rear planar wall 20b of housing 12. It is the intent of this design (i.e., embodiment C) to encourage the insertion of the user's finger through cut-out portion 102 as well as aperture 100 and thereafter through a central hole (not shown) in disc 16, following which the outer edge of disc 16 would naturally be grasped by the user's thumb to facilitate its removal from package 10.

Insert 14 has been designed as a tray with a grooved capturing ring 56 formed by base 44 and seat member 58 for grasping the lower circumferential edge portion of disc 16. This portion of insert 14 always remains within housing 12 and terminates at the area where living hinge 93 is molded.

The remaining portion of insert 14, which extends beyond housing 12, comprises a molded, ring-shaped plateau 106 which supports the upper circumferential edge portion of disc 16 when package 10 is closed. Both grooved capturing ring 56 and plateau 106 are co-planar when package 10 is closed (as may be more clearly seen in FIG. 20A) and neither touches disc 16 at any time at any point other than on the uncoded perimeter portion thereof.

This arrangement is due to the geometric orientation of these segments wherein the surface of base 44 in the vicinity of capturing ring 56 is molded in the shape of one-half of a very shallow inverted cone. Disc 16, when passing over this surface, rides only upon its edges. Only upon reaching a narrow perimeter shelf 104 does disc 16 seat between shelf 104 and the abutting narrow overhang.

Edge 28 of closure 20a serves a similar function to that of the upper closure edge in embodiments A and B in that its V-shaped profile guides disc 16 into grooved capturing ring 56 in a manner such that the information-bearing surface of disc 16 does not scrape across the rough surface of housing 12 during its insertion or removal from package 10.

Upper winged fingers 108 of capturing ring 56 (which are more easily viewed in the close-up view illustrated in FIG. 20A) are inclined outwardly i.e., toward closure 20a, to guide booklet 66 (not shown) into its proper position between seat member 58 and the interior surface of closure 20a. Booklet 66 is thus prevented from accidentally entering capturing ring 56, which is reserved for disc 16. Rib members 110 extending perpendicularly from an upper surface of flexible insert 14, also serve a function with respect to booklet 66. When the upper hinged portion of insert 14 is rotated upwardly toward the undersurface of disc 16, ribs 110 serve to support booklet 66 and prevent it from laying directly atop disc 16. Additionally, molded ridges on lid 32 serve to push booklet 66 back into housing 12 once package 10 has been opened to remove or replace disc 16.

FIG. 21 is similar to FIGS. 2 and 11 in that it illustrates upper plan surface 62 of lid 32. Lid 32, it should be noted, is formed as an integral part of insert 14.

FIG. 22 is a sectional view taken entirely through embodiment C of package 10. Viewing FIG. 22 from left to right, there is illustrated closure 20a, booklet 66, seat member 58, disc 16, conically profiled base 44, liner notes 64 and rear planar wall 20b of housing 12. The orientation of disc 16 upon insert 14 in embodiment C may be more easily understood from a review of FIG. 22. It is readily apparent from this illustration that no part of disc 16, other than its peripheral edge portions, is contacted by insert 14 when disc 16 is stored in package 10. This separation is indicated by a space 114 between the disc 16 and the insert 14, except at the peripheral edge of disc 16.

FIG. 23 is a partial rear view of insert 14 utilized with embodiment C, illustrating the features thereof. A peripheral edge portion of base 44 is attached to seat member 58 at a number of locations, preferably 3, spaced along the semicircular arc of capturing ring 56. This attachment is effected by molded members 116 which extend outwardly from the periphery of base 44 and then upwardly at a substantially right angle to a rear surface of seat member 58. In the area between each attachment member 116 lies grooved ring 56 which is of a width sufficient to accept an edge portion of disc 16.

The rear surface of disc 16 is observable through aperture 100 in insert 14. To remove disc 16 from insert 14, the portion of insert 14 above hinge 93 may be rotated downwardly out of the way with the user then placing his finger through aperture 118 in disc 16. While grasping the edge of disc 16 with his thumb and forefinger, the user thus pulls the edge of disc 16 out of grooved ring 56.

FIG. 23 additionally illustrates the fit between notches 94 located in a base portion of insert 14, which engage members 96, projecting from base 22 of housing 12. This arrangement serves as registration means to correctly position booklet 66 within housing 12, between members 96 and closure 20a when package 10 is closed. The figure further discloses flexible tabs 79 having projections 90 for maintaining insert 14 at least partially within housing 12 by catching on raised ribs 92.

FIG. 24 is a sectional view through projecting member 98 located on the inner face of closure 20a, shown in phantom in FIG. 23. Member 98 abuts against a recessed portion of lid 32 when package 10 is closed.

FIG. 25 is a sectional view taken through one of attachment members 116 illustrating the means by which base 44 is attached to seat member 58 so as to form grooved capturing ring 56. Ring 56 is of sufficient width to accept a peripheral edge of disc 16.

FIG. 26 is a sectional view through a notch 94 in the base of insert 14 and a corresponding projecting member 96 extending from bottom member 22 of housing 12. Members 96, whose rear surface abuts against planar wall 20b, additionally ensure, as noted with regard to the discussion of FIG. 23, that booklet 66 slides down the inclined surface thereof to rest in its proper location, i.e., against the inner surface of closure 20a.

FIG. 27 depicts embodiment C of applicants' package 10. From left to right, this view illustrates closure 20a, booklet 66, seat member 58, disc 16 and base 44 of insert 14, a lower portion of which is molded with a funnel-shaped configuration, having an upper portion which may be rearwardly rotated through an arc around living hinge 93. The subject drawing figure additionally illustrates the process by which extension 90 on flexible tab 79 catches upon raised ridge 92 to prevent insert 14 from being drawn out of housing 12 past the point where hinge 93 is approximately level with the mouth of housing 12.

FIG. 28 is a sectional view through package 10 illustrating a flexible tab 79 having, on a terminal portion thereof, a projecting member 90 whose purpose is to catch on ridge 92 (see FIG. 27) to prevent insert 14 from being pulled completely out of housing 12. An inclined gap 88 between flexible tab 79 and the body portion of insert 14 permits tab 79 to flex inwardly so as to bypass ridge 92 when insert 14 is originally slid within housing 12.

FIG. 29 is a sectional view through package 10 taken through a higher plane than that depicted in FIG. 28. This view is included to illustrate the engagement between a flexible tab 79 and one of ridges 92.

While it is apparent that the invention herein disclosed is well calculated to fulfill the objects above stated, it will be appreciated that numerous modifications and embodiments may be devised by those skilled in the art and it is intended that the appended claims cover all such modifications and embodiments as fall within the true spirit and scope of the present invention.

We claim:

1. An insertable drawer member configured and dimensioned for receiving and storing digital disc means within an outer housing in a manner which ensures that information bearing areas of said disc means are not damaged during insertion or removal therefrom, said insertable drawer member comprising:
   (a) a base at least partially defined by a pair of opposed side walls, said base having upon one surface thereof a semicircular groove configured and dimensioned for removably receiving said digital disc means by pressure contact with non-information bearing areas of said digital disc means so as to releasably retain said disc means within said groove;
   (b) a lid integrally attached to an upper portion of said base, said lid having on at least a portion of a front face thereof, a serrated gripping area to facilitate grasping of said lid for movement thereof to access said disc means, said lid further being configured and dimensioned to include a V-shaped lower edge for contact relation with a corresponding V-shaped edge of said outer housing which V-shaped edge ensures insertion and removal of said disc means in a manner which avoids damage to information bearing areas thereof; and
   (c) means for retaining said insertable drawer member and disc means within said housing by pressure contact with an interior portion of said housing.

2. The insertable drawer member of claim 1 wherein said digital disc means is a compact disc, CD-ROM or a video laserdisc.

3. The insertable drawer member of claim 1 wherein said base includes an arcuately shaped seat member spaced a distance apart from a flat plate member, said seat member and said plate member forming a front face and a rear face, respectively, of said semicircular groove, wherein said groove is formed by the space therebetween.

4. The insertable drawer member of claim 3 wherein a portion of said plate member forming the rear face of said semicircular groove, configured to substantially conform to the shape of said groove, is at least partially detached from a remainder of said plate member to form flexible flap means.

5. The insertable drawer member of claim 3 wherein said semicircular groove further comprises at least one projecting member positioned to allow a degree of separation within said groove sufficient to permit retention of at least an uncoded peripheral portion of said digital disc means therein by pressure contact without scratching or otherwise damaging a remaining coded portion of said disc means thereon.

6. The insertable drawer member of claim 1 wherein said base further comprises guide means for directing said disc means into said semicircular groove.

7. The insertable drawer member of claim 6 wherein said guide means comprise a pair of integrally formed vertical rib members located along corresponding vertical edge portions of said drawer member, said rib members being configured and adapted to contact an edge portion of said digital disc means so as to guide said disc means into said semicircular groove.

8. The insertable drawer member of claim 1 wherein said retaining means comprises at least one aperture defined by said base, said aperture configured for an interlocking fit with ramp means located on an inner surface of a rear longitudinal face of said housing so as to maintain said drawer member therein.

9. The insertable drawer member of claim 1 wherein said lid is operatively attached to a remaining portion of said insert by hinge means.

10. The insertable drawer member of claim 9 wherein said hinge means is a living hinge.

11. The insertable drawer member of claim 9 wherein said lid further comprises at least one locking member extending from a lower surface thereof into an interior portion of said housing, each said locking member having a perpendicular extension at a terminal portion thereof furtherest removed from said lid, said perpendicular extension configured for an interlocking fit with a grooved portion of a lateral side wall of said housing.

12. The insertable drawer member of claim 1 wherein said housing is configured, sized and adapted to form a clear, protective outer packaging for said digital disc means located upon said insertable drawer member within, to protect said information-bearing areas on said disc means from damaging contact with any external sharp or rough surfaces and to provide a convenient opening, compact storage container for said disc means.

13. An insertable drawer member configured and dimensioned for receiving and storing digitally coded discs such as compact discs, CD-ROMs, video laserdiscs and the like within an outer housing in a manner which ensures that information-bearing areas of said discs are not damaged during insertion or removal therefrom, said insertable drawer member comprising:

(a) a base defined by a pair of opposed parallel side walls, said base comprising a semicircular groove formed by an arcuately shaped seat member spaced a distance apart from a flat plate member, said seat membr and said plate member forming a front face and a rear face, respectively, of said semicircular groove, wherein said groove is formed by the space therebetween, and wherein a portion of said plate member forming a rear face of said semicircular groove, shaped and configured to substantially conform to the shape of said groove, is at least partially detached from a remainder of said plate member to form flexible flap means, said semicircular groove additionally comprising at least one projecting member positioned to permit a degree of separation within said groove sufficient to removably retain by pressure contact at least an uncoded peripheral portion of said digitally coded disc without scratching or otherwise damaging a remaining coded portion thereof, said base further comprising a pair of integrally formed vertical rib members located along corresponding vertical edge portions of said drawer member, said rib members configured and adapted to initially contact an edge portion of said disc to guide said edge portion into said semicircular groove;

(b) a lid integrally attached to said base by a hinge, said lid having on at least a portion of a front face thereof, a serrated gripping area to facilitate grasping of said lid for movement thereof to access said disc, said lid further being configured and dimensioned to include a V-shaped lower edge for contact relation with a corresponding V-shaped edge of said housing, which V-shaped edge ensures insertion and removal of said digital disc in a manner which avoids damage to information-bearing areas thereof and said lid further comprising at least one locking member extending from a lower surface thereof into an interior portion of said housing, each locking member having a perpendicular extension configured for an interlocking fit with a corresponding grooved portion of a lateral side wall of said housing; and (c) at least one ramp means extending into an interior portion of said housing from an inner surface of a rear longitudinal wall of said housing, said ramp means configured for an interlocking fit with a corresponding aperture defined by said plate member, to maintain said insert within said housing.

14. The insertable drawer member of claim 1 wherein said base is constructed having a curved, semi-cylindrical surface to facilitate a frictional fit between said insertable drawer member and said outer housing.

15. The insertable drawer member of claim 14 wherein said base further comprises at least one tab member extending perpendicularly therefrom along a vertical edge thereof, said tab member acting to substantially reduce the curvature of said drawer member upon contact with an inner surface of said housing when said drawer member is inserted within said housing, to create a frictional fit therebetween.

16. The insertable drawer member of claim 15 wherein said base further comprises a pair of flexible members formed on a lower terminal portion of each said opposed side wall.

17. The insertable drawer member of claim 16 wherein each said flexible member further comprises a notched portion configured for an interlocking fit with a raised ridge formed integrally with each corresponding side wall of said housing.

18. The insertable drawer member of claim 15 wherein said base further comprises at least one channel means, each said channel means being configured for an interlocking fit with corresponding ramp means extending thereinto from an inner surface of a rear longitudinal wall of said housing, to maintain said insert at least partially within said housing.

19. The insertable drawer member of claim 18 wherein said curved, semi-cylindrical base is constructed having a plurality of corrugations upon a rear surface thereof in an area adjacent said channel means, said corrugations increasing the flexibility of said base portion without concurrently increasing the thickness thereof.

20. An insertable drawer member configured and dimensioned for receiving and storing digitally coded discs such as compact discs, CD-ROMs, video laserdiscs and the like within an outer housing in a manner which ensures that information-bearing areas of said discs are not damaged during insertion or removal therefrom, said insertable drawer member comprising:

(a) a base having a curved, semi-circular surface, said base defined by a pair of opposed parallel side walls wherein at least one tab member extends perpendicularly from a front surface along a vertical edge thereof, said tab member acting to substantially reduce the curvature of said drawer member upon contact with an inner surface of a closure member upon said housing when said drawer member is inserted therein, said base further comprising a semicircular groove formed by an arcuately shaped seat member spaced a distance apart from a flat plate member, said seat member and said plate member forming a front face and a rear face, respectively, of a semicircular groove, wherein said groove is formed by the space therebetween, and wherein a portion of said plate member forming a rear face of said semicircular groove, shaped and configured to substantially conform to the shape of said groove is at least partially detached from a remainder of said plate member to form flexible flap means, said semicircular groove additionally comprising at least one projecting member positioned to permit a degree of separation within said groove sufficient to allow retention by pressure contact of at least an uncoded peripheral portion of said digital disc without scratching or otherwise damaging a remaining coded portion thereof, said base further comprising a pair of integrally formed vertical rib members located along corresponding vertical edge portions of said drawer member, said rib members configured and adapted to initially contact an edge portion of said disc to guide said edge portion into said semicircular groove;

(b) a lid integrally formed with said base, said lid having on at least a portion of a front face thereof a serrated gripping area to facilitate grasping of said lid for movement thereof to access said disc, said lid further being configured and dimensioned to include a V-shaped lower edge for contact relation with a corresponding V-shaped upper edge portion of said housing, which V-shaped edge ensures insertion and removal of said digital disc in a manner which avoids damage to information-bearing areas thereof;

(c) at least one ramp means extending into an interior portion of said housing from an inner surface of a rear longitudinal wall thereof, said ramp means configured for sliding engagement within corresponding vertical channel portions in said base, said base additionally having corrugations on a rear surface thereof in the vicinity of said channel portions to increase the flexibility of said semicylindrical base without a concurrent increase in the thickness thereof; and (d) at least one flexible member located at a lower terminal portion of at least one of said opposed parallel side walls, each said flexible member having a notched portion thereon for engagement with a corresponding raised ridge on an adjacent lateral side wall of said housing.

21. The insertable drawer member of claim 1 wherein said base is divided into an upper and a lower portion by hinge means located therebetween so as to permit downward rotation of said upper portion from a first position, coplanar with said lower portion, to a second position, spaced a distance therefrom.

22. The insertable drawer member of claim 21 wherein said hinge means for dividing said base into an upper portion and a lower portion is a living hinge.

23. The insertable drawer member of claim 21 wherein said lower portion of said base is configured in the form of a shallow funnel so as to prevent any portion other than an uncoded edge of said digital disc means from contacting said insert when said disc means is accessed.

24. The insertable drawer member of claim 23 wherein said lower portion of said base further comprises a relatively narrow, arcuately configured peripheral shelf, said shelf located adjacent said semicircular groove and providing support for the non-information bearing area of said disc means.

25. The insertable drawer member of claim 21 wherein said upper portion of said base comprises an arcuately shaped raised plateau to support an upper circumferential portion of said disc means when said drawer member is inserted within said housing.

26. The insertable drawer member of claim 21 wherein said lower portion of said base has at least one notch located in a bottom portion thereof, each said notch being configured for an interlocking fit with a seat member projecting perpendicularly upward into an interior portion of said housing from a horizontal base of said housing.

27. The insertable drawer member of claim 21 wherein each said side wall of said base has flexible tab means located at a bottom terminal portion thereof, configured to maintain said drawer member at least partially within said housing.

28. The insertable drawer member of claim 27 wherein each said flexible tab means has a perpendicular projection located thereon, configured for engagement with raised rib means located on an inner surface of a rear longitudinal surface of said housing.

29. An insertable drawer member configured and dimensioned for receiving and storing digitally coded discs such as compact discs, CD-ROMs, video laser-discs and the like within an outer housing in a manner which ensures that information bearing areas of said discs are not damaged during insertion or removal therefrom, said insertable drawer member comprising:

(a) a base at least partially defined by a pair of opposed parallel side walls, said base being divided into an upper portion and a lower portion by hinge means located therebetween to permit the downward rotation of said upper portion from a first position coplanar with said lower portion to a second position spaced a distance therefrom, said lower portion of said base being configured in the form of a shallow funnel to prevent any portion other than an uncoded edge portion of said disc from being contacted by said insert, wherein said lower portion of said base has a relatively narrow, arcuately configured peripheral shelf located adjacent a semicircular groove formed therein, said lower portion further comprising an arcuately shaped seat member spaced a distance apart from a flat plate member, said seat member and said plate member forming a front face and a rear face, respectively, of said semicircular groove, wherein said groove is formed by the space therebetween, a portion of said plate member forming a rear face of said groove being at least partially detached from a remaining portion of said plate portion, said semicircular groove additionally comprising at least one member positioned to permit a degree of separation within said groove sufficient to allow retention by pressure contact of at least an uncoded peripheral portion of said disc without scratching or otherwise damaging a remaining coded portion thereof, and further wherein said upper portion of said base comprises an arcuately shaped raised plateau to support an upper circumferential portion of said disc;

(b) a lid integrally formed with said base, said lid having on at least a portion of a front face thereof a serrated gripping area to facilitate grasping of said lid for movement thereof to access said digital disc, said lid further being configured and dimensioned to include a V-shaped lower edge for contact relation with a corresponding V-shaped upper edge portion of said housing, which V-shaped edge ensures insertion and removal of said digital disc in a manner which avoids damage to information-bearing areas thereof; and (c) flexible tab means located upon a bottom terminal portion of each said side wall, each said flexible tab means having a perpendicular projection located thereon which is configured for engagement with raised rib means located upon an inner surface of a rear longitudinal wall of said housing in order to maintain said insertable drawer member at least partially within said outer housing.

30. An insertable drawer member configured and dimensioned for receiving and storing digitally coded discs such as compact discs, CD-ROMs, video laserdiscs and the like within an outer housing in a manner which ensures that information-bearing areas of said discs are not damaged during insertion or removal therefrom, said insertable drawer member comprising:

(a) a base defined by a pair of opposed parallel side walls, said base comprising a lower portion having located thereon a semi-circular groove formed by an arcuately shaped seat member spaced a distance apart from a flat plate member, said seat member and said plate member forming a front face and a rear face, respectively, of said semicircular groove, wherein said groove is formed by the space therebetween, and wherein a portion of said plate member forming a rear face of said semicircular groove, shaped and configured to substantially conform to the shape of said groove, is at least partially detached from a remainder of said plate member to form flexible flap means, said lower portion of said base being configured in the form of a shallow funnel to prevent any portion other than an uncoded edge portion of said disc from being contacted by said insert and wherein said lower portion further comprises relatively narrow, arcuately configured peripheral shelf means located adjacent said semicircular groove and corresponding to the shape thereof, said groove additionally comprising at least one projecting member positioned to permit a degree of separation therein sufficient to removably retain by pressure contact at least an uncoded peripheral portion of said digitally coded disc without scratching or otherwise damaging a remaining coded portion thereof;

(b) a lid integrally attached to said base by a hinge, said lid having on at least a portion of a front face thereof, a serrated gripping area to facilitate grasping of said lid for movement thereof to access said disc, said lid further being configured and dimensioned to include a V-shaped lower edge for contact relation with a corresponding V-shaped edge of said housing, which V-shaped edge ensures insertion and removal of said digital disc in a manner which avoids damage to information-bearing areas thereof and said lid further comprising at least one locking member extending from a lower surface thereof into an interior portion of said housing, each said locking member having a perpendicular extension configured for an interlocking fit with a corresponding grooved portion of a lateral side wall of said housing; and (c) flexible tab means located upon a bottom terminal portion of each said side wall, each said flexible tab means having a perpendicular projection located thereon which is configured for engagement with raised rib means located upon an inner surface of a rear longitudinal wall of said housing in order to maintain said insertable drawer member at least partially within said outer housing.

31. An insertable drawer member configured and dimensioned for receiving and storing digitally coded discs such as compact discs, CD-ROMs, video laserdiscs and the like within an outer housing in a manner which ensures that information-bearing areas of said discs are not damaged during insertion or removal therefrom, said insertable drawer member comprising:

(a) a base having a curved, semi-circular surface and defined by a pair of opposed parallel side walls wherein at least one tab member extends perpendicularly from a front surface along a vertical edge thereof, said tab member, acting to substantially reduce the curvature of said drawer member upon contact with an inner surface of a closure member of said housing when said drawer member is inserted therein, a lower portion of said base further comprising a semicircular groove formed by an arcuately shaped seat member spaced a distance apart from a flat plate member, said seat member and said plate member forming a front face and a rear face, respectively, of a semicircular groove wherein said groove is formed by the space therebetween and wherein a portion of said plate member forming said rear face of said groove, shaped and configured to substantially conform to the shape of said groove is at least partially detached from a remainder of said plate member to form flexible flap means, said lower portion of said base being configured in the form of a shallow funnel to prevent any portion other than an uncoded edge portion of said disc from being contacted by said insert and wherein said lower portion further comprises relatively narrow, arcuately configured shelf means located adjacent said semicircular groove and corresponding to the shape thereof, said groove additionally comprising at least one projecting member positioned to permit a degree of separation therein sufficient to allow retention by pressure contact of at least an uncoded peripheral portion of said uncoded disc without scratching or otherwise damaging a remaining uncoded portion thereof;

(b) a lid integrally formed with said base, said lid having on at least a portion of a front face thereof a serrated gripping area to facilitate grasping of said lid for movement thereof to access said disc, said lid further being configured and dimensioned to include a V-shaped lower edge for contact relation with a corresponding V-shaped upper edge portion of said housing, which V-shaped edge ensures insertion and removal of said digital disc in a manner which avoids damage to information-bearing areas thereof;

(c) flexible tab means located upon a bottom terminal portion of each said side wall, each said flexible tab means having a perpendicular projection located thereon which is configured for engagement with raised rib means located upon an inner surface of a rear longitudinal wall of said housing in order to maintain said insertable drawer member at least partially within said outer housing.

* * * * *